United States Patent
Hajost (10) Patent No.: US 11,824,895 B2
(45) Date of Patent: Nov. 21, 2023

(54) SYSTEM FOR PROCESSING CONTENT IN SCAN AND REMEDIATION PROCESSING

(71) Applicant: SteelCloud, LLC, Ashburn, VA (US)

(72) Inventor: Brian H. Hajost, Great Falls, VA (US)

(73) Assignee: Steelcloud, LLC., Ashburn, VA (US)

( * ) Notice: Subject to any disclaimer, the term of this patent is extended or adjusted under 35 U.S.C. 154(b) by 397 days.

(21) Appl. No.: 15/854,992

(22) Filed: Dec. 27, 2017

(65) Prior Publication Data
US 2019/0199754 A1   Jun. 27, 2019

(51) Int. Cl.
| H04L 9/00 | (2022.01) |
| H04L 9/40 | (2022.01) |
| G06F 11/14 | (2006.01) |
| G06F 21/57 | (2013.01) |

(52) U.S. Cl.
CPC .......... *H04L 63/20* (2013.01); *G06F 11/1469* (2013.01); *G06F 21/577* (2013.01); *H04L 63/105* (2013.01); *H04L 63/1433* (2013.01); *G06F 2201/80* (2013.01)

(58) Field of Classification Search
CPC ... H04L 63/1433; H04L 63/20; H04L 63/105; G06F 11/1469; G06F 21/577; G06F 2201/80; G06F 2221/2141
See application file for complete search history.

(56) References Cited

U.S. PATENT DOCUMENTS

| 6,249,866 | B1 | 6/2001 | Brundrett |
| 6,675,382 | B1 | 1/2004 | Foster |
| 7,143,439 | B2 | 11/2006 | Cooper |
| 7,266,819 | B2 | 9/2007 | Helgesen |
| 7,565,416 | B1 | 7/2009 | Shafer |
| 8,010,777 | B2 | 8/2011 | Nandan |
| 8,245,310 | B2 | 8/2012 | Grigorovitch |
| 8,261,354 | B2 | 9/2012 | Kline |
| 8,474,698 | B1 | 7/2013 | Billett |
| 8,528,059 | B1 | 9/2013 | Labana |
| 8,549,326 | B2 | 10/2013 | Mohamed |
| 2003/0115461 | A1 | 6/2003 | O'Neill |

(Continued)

FOREIGN PATENT DOCUMENTS

EP    2693692    2/2014

*Primary Examiner* — Daniel B Potratz
*Assistant Examiner* — Syed M Ahsan
(74) *Attorney, Agent, or Firm* — CRGO Global; Steven M. Greenberg (57) ABSTRACT

Embodiments of the present invention provide for a method, system, and apparatus for processing content during scan and/or remediation processing. The method includes receiving a scan request or a remediation request. Content from a datastore referencing one or more controls as well as one or more of a compliance value, remediation value, and an ignore switch corresponding to each control is then loaded. If a scan request is received, the computing environment is scanned to determine all controls in the computing environment and the current setting of each. Thereafter, a subset of controls is determined, where the current setting of each control in the subset is out of compliance, the out of compliance state for each control is not to be ignored, and a remediation value for the corresponding control is listed in the loaded content. Thereafter, information regarding each control is determined, captured, and then stored.

13 Claims, 3 Drawing Sheets

(56) References Cited

U.S. PATENT DOCUMENTS

| | | |
|---|---|---|
| 2003/0163559 A1 | 8/2003 | Dini |
| 2003/0188160 A1 | 10/2003 | Sunder et al. |
| 2004/0003266 A1 | 1/2004 | Moshir et al. |
| 2004/0105545 A1 | 6/2004 | Khandelwal |
| 2005/0038881 A1 | 2/2005 | Ben-Itzhak |
| 2005/0114688 A1 | 5/2005 | Leis |
| 2006/0015841 A1 | 1/2006 | Bishop |
| 2006/0147043 A1 | 7/2006 | Mann |
| 2006/0224544 A1 | 10/2006 | Keith, Jr. |
| 2006/0224742 A1 | 10/2006 | Shahbazi |
| 2006/0236363 A1 | 10/2006 | Heard |
| 2006/0242685 A1 | 10/2006 | Heard |
| 2007/0044077 A1 | 2/2007 | Srivastava |
| 2007/0100892 A1* | 5/2007 | Kephart ............ G06Q 10/06 |
| 2007/0239979 A1 | 10/2007 | Berger |
| 2007/0294593 A1 | 12/2007 | Haller |
| 2008/0052395 A1 | 2/2008 | Wright |
| 2008/0077971 A1 | 3/2008 | Wright |
| 2008/0184200 A1 | 7/2008 | Burns |
| 2008/0320109 A1 | 12/2008 | Andrews |
| 2009/0300712 A1 | 12/2009 | Kaufmann |
| 2010/0031249 A1 | 2/2010 | Baliga |
| 2010/0154026 A1 | 6/2010 | Chatterjee |
| 2010/0235649 A1 | 9/2010 | Jeffries |
| 2010/0257539 A1 | 10/2010 | Narayanan |
| 2011/0093914 A1 | 4/2011 | Jacobson |
| 2012/0084263 A1 | 4/2012 | Gosnell |
| 2012/0102329 A1 | 4/2012 | Mittal |
| 2012/0155323 A1 | 6/2012 | Ramachandran et al. |
| 2012/0198223 A1 | 8/2012 | Tukol |
| 2012/0210387 A1 | 8/2012 | Sampigethaya |
| 2012/0246126 A1 | 9/2012 | Rodriguez |
| 2012/0311207 A1 | 12/2012 | Powers |
| 2013/0055335 A1 | 2/2013 | Chien |
| 2013/0097296 A1 | 4/2013 | Gehrmann |
| 2013/0145178 A1 | 6/2013 | Jeffries |
| 2013/0238768 A1 | 9/2013 | Vaidya |
| 2014/0040990 A1 | 2/2014 | Nguyen et al. |
| 2014/0053227 A1 | 2/2014 | Ruppin |
| 2014/0075495 A1 | 3/2014 | Paris |
| 2014/0223176 A1 | 8/2014 | Hajost et al. |
| 2015/0127995 A1* | 5/2015 | Kripalani ............ G06F 11/321 |
| | | 714/47.1 |
| 2015/0193629 A1 | 7/2015 | Hajost et al. |
| 2016/0212164 A1 | 7/2016 | Nguyen et al. |
| 2016/0301715 A1 | 10/2016 | Hajost et al. |
| 2017/0093813 A1 | 3/2017 | Hajost et al. |
| 2018/0062941 A1* | 3/2018 | Brown ............ H04L 41/5019 |
| 2018/0176254 A1* | 6/2018 | Lam ............ H04L 63/105 |
| 2019/0104156 A1* | 4/2019 | Barkovic ............ H04L 67/60 |
| 2019/0188380 A1* | 6/2019 | Animireddygari ............ G06F 11/1469 |

\* cited by examiner

SYSTEM FOR PROCESSING CONTENT IN SCAN AND REMEDIATION PROCESSING

CROSS-REFERENCE TO RELATED APPLICATIONS

This application is related to the family of patents and applications entitled VERIFICATION OF COMPUTER SYSTEM PRIOR TO AND SUBSEQUENCY TO COMPUTER INSTALLATION including U.S. patent application Ser. No. 15/824,272, filed on Nov. 28, 2017, now pending, which is a Continuation of U.S. patent application Ser. No. 15/083,700, filed on Mar. 29, 2016, now U.S. Pat. No. 9,853,990, which is a Continuation of U.S. patent application Ser. No. 13/567,011, filed on Aug. 4, 2012, now U.S. Pat. No. 9,313,040, all of the teachings of which are incorporated herein by reference in their entirety. This application is also related to European Patent Application No. EP13178684.0, filed Jul. 31, 2013, the teachings of which, also, are incorporated herein by reference. In addition, this application is related to the family of patents and applications entitled AUTOMATING THE CREATION AND MAINTENANCE OF POLICY COMPLIANT ENVIRONMENTS, including U.S. application Ser. No. 15/372,886, filed Dec. 8, 2016, now pending, which is a Continuation of U.S. patent application Ser. No. 15/180,886, filed on Jun. 13, 2016, now allowed, which is a Continuation of U.S. patent application Ser. No. 14/666,158, filed on Mar. 23, 2015, now U.S. Pat. No. 9,367,699, which is a Continuation-in-Part of U.S. application Ser. No. 13/761,514, filed Feb. 7, 2013, now U.S. Pat. No. 8,990,559, all of the teaching of which are also incorporated herein by reference in their entirety.

BACKGROUND OF THE INVENTION

Field of the Invention

The present invention relates to computer enterprise systems and more particularly to maintaining policy compliant computers in a computer enterprise system.

Description of the Related Art

In computing, hardening is the process of securing a system by reducing its surface vulnerability. This process can include reducing available vectors of attack by removing unnecessary software, usernames or logins, and disabling or removing services, which can lead to a more secure system. There are various methods of hardening systems, which can include applying a patch to the kernel, closing open network ports, and setting up intrusion-detection systems, firewalls, and intrusion prevision systems. In addition, there can be hardening scripts that can, for instance, deactivate unneeded features in configuration files or perform various other protective measures.

Currently, the only way to implement and maintain standardized computer policy (hardening) across and between enterprises is to describe the policy in a document. Some hardening policies can be extremely long—several hundred pages in length. In addition, these types of policies do not always include specification for all system components, such as structured query language (SQL) servers, .NET, or Internet Information Services (IIS). Further, some policy documents only describe the destination, but do not provide guidance on how to reach the destination. Without adequate guidance, someone, usually a system administrator or other expert, must review new hardening scripts, plan and strategize the implementation of the new hardening scripts, develop a team to implement such, hand implement and test each system, review the results, certify and approve the implementation, and then document and publish the work instructions so that technicians can implement the policy correctly on all systems. This process can take expertise, time, and money. Once hardening across and between enterprises is completed, a system administrator or another expert must still continue to monitor the different enterprises to ensure the system continues to comply with any and all standardized computer policy applied to the system.

One way a system administrator monitors the different enterprises to ensure the system continues to comply with any and all standardized computer policy applied to the system is to conduct system scans to obtain the current statuses of the controls in the system. However, the current scan process only collects data and reports what values are non-conforming with the applied computer policy and does not change any value for fear of breaking the system if the non-conforming value is changed. In addition, even if the non-conforming value is changed, there is no traceability between the new value and old value.

BRIEF SUMMARY OF THE INVENTION

Embodiments of the present invention address deficiencies of the art with respect to maintaining policy compliance across computing environments and provide a novel and non-obvious method, system, and computer program product for processing content during scan and/or remediation processing. In an embodiment of the invention, a scan request or a remediation request is received. Thereafter content is loaded, which includes information (data) regarding one or more controls in the computing environment. For each control listed, one or more of a compliance value, a remediation value, and an ignore switch is included. On the condition that the received request is a scan request, the computing environment is scanned to determine all controls and the current setting of each control. Thereafter, a subset of controls from all controls in the computing environment is determined. If every control in the subset of controls has been determined to be out of compliance, the out of compliance state is not to be ignored, and a remediation value exists for the corresponding control in the loaded content. Further, for each control in the subset of controls, information is determined and captured, including one or more of the current settings of the control, the compliance value for the control, the remediation value defined for the control, whether the control is out of compliance, and whether an ignore switch is present. Once the information is determined and captured for the subset of controls, it is stored for each control.

In another embodiment of the invention, a compliance system can be provided. The system can include a computer with at least one processor and memory and a compliance module. The compliance module can include program code enabled upon execution in memory of the computer to receive a scan request or a remediation request. The program code of the compliance module can further include program code to load content information on one or more controls in the computing environment. The content also includes, for each listed control, one or more of a compliance value, a remediation value, and an ignore switch. Thereafter, the program code of the compliance module further includes program code to scan the computing environment to determine all controls in the computing environment and also the current setting for each control, on condition that the received request is a scan request. The program code of the compliance module then determines a subset of controls, where each control in the subset is out of compliance, the out of compliance cannot be ignored, and a remediation value corresponding to the control is defined in the loaded content. Then, for each control in the subset, information is determined, captured, and then stored. The information includes one or more of the current setting, the compliance value, the remediation value, whether the control is out of compliance, and whether or not there is the ignore switch.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred; it being understood, however, that the invention is not limited to the precise arrangements and instrumentalities shown, wherein.

DETAILED DESCRIPTION OF THE INVENTION

Embodiments of the invention provide for processing content during scan and/or remediation processing. In accordance with an embodiment of the invention, following the receipt of a request for scanning and/or remediating a computing environment, content is loaded. The content includes separate compliance and remediation content (or logic) as well as a variety of different logic switches for the different controls in the computing environment. Depending on the substance of the content as well as the request for scanning and/or remediating, the settings of specific different controls in the computing environment may be (1) stored, (2) ignored, and/or (3) remediated. In this way, a remediation value different than a compliance value for a specific control in the computing environment is provided in order to fix the computing environment as required without losing the ability to trace changes to the computing environment. Further, separate compliance and remediation content allows for the storage of computing environment data, the processing of computing environment data, and the separation of computing environment data based on discrete compliance and remediation content, which enables the creation of output, including reports.

Figure 1:
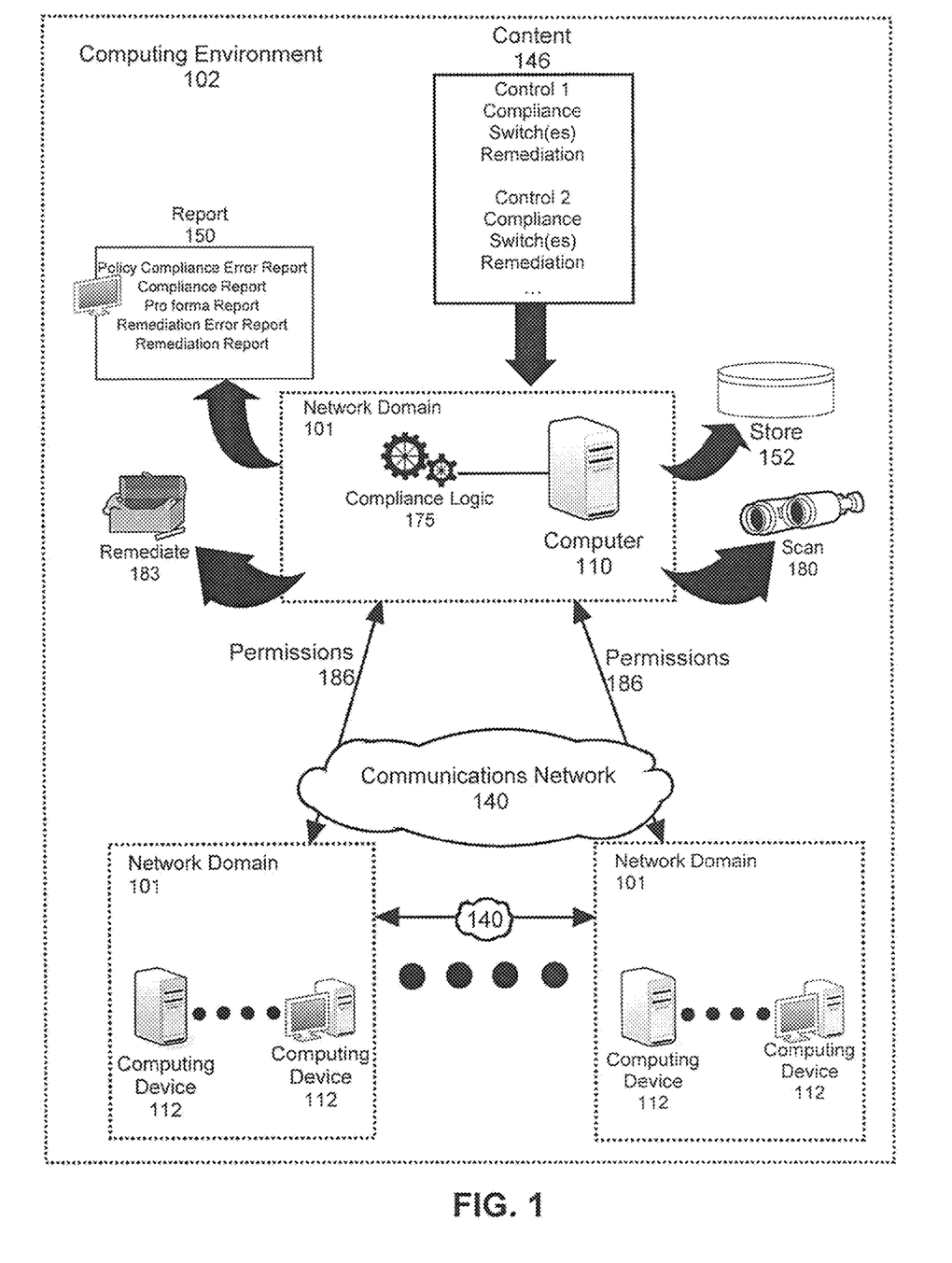
FIG. 1 is a pictorial illustration of a process for processing content during scan and/or remediation processing in a computing environment.

In further illustration, FIG. 1 depicts a process for processing content during scan and/or remediation processing in a computing environment. The computing environment 102 includes different computing devices 112 within different network domains 101 defined over a communications network 140. The computing environment may also include one or more end points (computing devices 112) outside of the network domain 101. Compliance logic 175 on a computer 110 in a network domain 101 loads content 146. The content 146 is information gathered from a datastore that includes a list of controls and for each control includes compliance content (a setting or a range required for a specific control to be in compliance with the current policy governing the system) and may also include remediation content (a new value that the current setting for the corresponding control can be adjusted to) and one or more switches (or flags), such as ignore, accepted non-compliance, and control type. Additionally, the content 146 is written in any language that the compliance logic 175 can process and includes, but is not limited to, extensible markup language (XML). Of note, as used herein, a datastore is any repository of information; therefore, the content may be loaded from a file, a database, or anything now known or later developed that stores information. Of note, instead of a single source or single datastore, the content 146 may be obtained from more than one source. Therefore, the content 146 may be obtained from one file, multiple files, and/or one or more databases. For example, the compliance content for a list of controls along with any switches is listed in one datastore, and the remediation content for a list of controls along with any corresponding switches is stored in a separate datastore. Regardless of whether there is a single content 146 source (one datastore) or multiple sources (multi-datastores), the compliance content and remediation content is separate and discrete, but both are required in scan and remediation processing. In other words, even if there is a scan only request, both the compliance content and remediation content are loaded and used, rather than just one or the other. This, in part, allows for changes to the system to be tracked. Additionally, the content 146 is optionally encrypted. If the content 146 is encrypted, compliance logic 175 must decrypt the content 146 before loading it. Of note, a control can be anything in the system, including but not limited to, a registry key, an entry in a configuration file (such as in a Security Technical Implementation Guide (STIG)), a specific computer software product, a port setting, etc. that is required by a policy to maintain compliance between a current enacted policy, such as a system security policy or hardening policy, and the computing environment 102.

Of note, the content or, more specifically, both compliance content and remediation content, is loaded following the receipt of a request to scan and/or remediate the system, which can be one or more network domains 101 or the entire computing environment 102. The request is initiated by any means now known or later developed by a user via a computer, such as from a computing device 112 in a network domain 101 or a computing device 112 in the computing environment 102. Additionally, the request indicates whether a "Scan Only" or a "Remediation" is to be preformed as well as what systems are to be scanned and/or remediated and, optionally, what type of report 150 regarding the results of the scan and/or remediation the user wants.

The compliance logic 175 may also determine whether the request is a request to remediate or a scan only request prior to loading the content 146 or after the content 146 is loaded. Regardless of when the content 146 is loaded, whether the request is one to remediate or a scan only request is determined by the compliance logic 175, in one embodiment, by parsing the request to see if a remediation flag (or switch) or a scan only flag (or switch) is present. In another embodiment, if no flag is present, the request is a scan only request.

After the content 146 is loaded and a determination is made as to whether the request is a scan only request or remediation request, the compliance logic 175 scans 180 the system. If the request was determined to be a scan only request, the scan 180 determines a list of all controls in the system and each control's current state (setting). Thereafter, the compliance logic 175 determines a subset of controls that are (1) out of compliance (the control's current status does not match or meet the compliance value listed in the loaded content 146), (2) the out of compliance state is not to be ignored (ignore flag is false or, in a different embodiment, no ignore flag is present at all for the specific control), and (3) has remediation content included for the corresponding control in the loaded content 146. This list of controls (the subset) along with the information determined by the compliance logic 175 (a control's current value, the required compliance value, the presence or absence of an ignore flag, and/or what the remediation value is) is then stored 152. In particular, this information is stored 152 in a matrix as part of a datastore. Of note, the information is stored 152 anywhere on the system. Thereafter, the compliance logic 175 generates reports 150 using the information stored 152 in the matrix. The reports include, but are not limited to, policy compliance error reports, compliance reports, pro forma reports, remediation error reports, and remediation reports. In addition, the reports may be filtered according to whether a control has one or more flags (switches), such as ignore, accepted non-compliance, and/or control type flag. The reports 150 may also be stored 152 and/or presented to a user via a dialog box or any other method now known or later developed.

However, if instead of a scan only request, the request is determined to be a remediation request, the compliance logic 175 still conducts a scan 180 of the system (the computing environment 102 or one or more network domains 101 or one or more computing devices 112 in a network domain 101). However, this scan is used, in part, to create a synchronous rollback file. More specifically, compliance logic 175 scans 180 the system to determine the current state of all controls as well as a list of controls from all the controls that are out of compliance (the current setting of a control does not comply (match) with the setting indicated in the compliance portion of the content 146 for a specific control, has an ignore flag (or switch) set to false (in other words, being out of compliance is not to be ignored or any other indication that the our of compliance status is not to be skipped), and there is remediation content in the remediation portion of the content 146 for the specific control). Thereafter, the compliance logic 175 creates a synchronous rollback file that includes the current state of a control for each control in the list of controls as well as what the remediation content is for the corresponding control. In this way, both the current state of a control is captured before remediation 183 as well as what the remediation value is as dictated by the loaded content 146. This information (current state of a control and the remediation value for the corresponding control) is then copied and moved by the compliance logic 175 for incorporation with the data (information) collected as part of the scan only process for use in generating reports 150.

After the captured information is moved, the compliance logic 175 remediates 183 the controls in the determined list of controls. In other words, the compliance logic 175 adjusts the current setting of a control to the remediation value listed in the remediation portion for that control in the loaded content 146. Of note, prior to remediation 183, the compliance logic 175 acquires administrative access or permissions 186 for each end point (any computing device 112) to be processed in the computing environment 102, if not already obtained. After remediation 183, compliance logic 175 re-scans 180 the system. As with the scan 180 associated with the scan only process, this re-scan 180 again scans the entire system to determine the current value of all the controls in the system. Thereafter, a different subset of controls that are (1) out of compliance (the control's current status does not match or meet the compliance value listed in the loaded content 146), (2) the out of compliance state is not to be ignored (ignore flag is false), and (3) has remediation content included for the corresponding control in the loaded content 146 is determined. This list of controls (the different subset) along with the information determined by the compliance logic 175 (a control's current value, the required compliance value, the presence or absence of an ignore flag, and what the remediation value is) and also the information moved prior to remediation 183 is then stored 152. Thereafter, the compliance logic 175 generates reports 150 using the information determined and captured and may store the reports.

Figure 2:
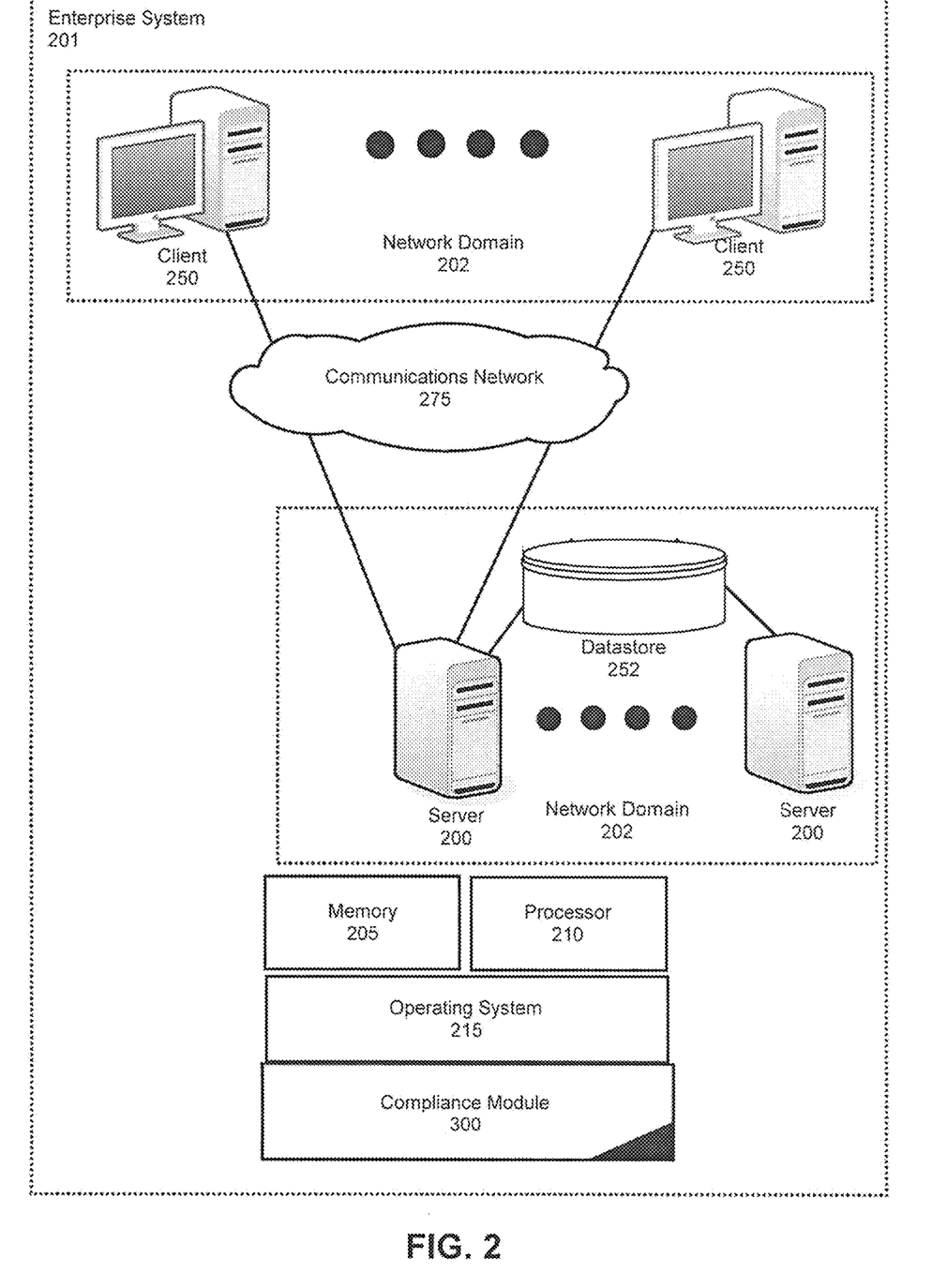
FIG. 2 is a schematic illustration of a compliance system configured to process content during scan and remediation processing in a computing environment; and, FIG. 3 is a flow chart illustrating a process for content processing during scan and remediation in a computer environment.

The process described in connection with FIG. 1 can be implemented in a compliance system. In further illustration, FIG. 2 schematically shows a compliance system configured to process content during scan and remediation processing in a computing environment. The compliance system includes at least one end point or client 250 coupled to at least one server 200 via a communications network 275. Though not pictured, one or more end points (clients 250) also may be outside of the network domain 202, but within the enterprise system 201 and coupled to the at least one server 200 via a communications network 275. One or more datastores 252 are also coupled to the server 200, which further includes at least one processor 210 and memory 205 supporting the execution of an operating system (O/S) 215. Of note, a datastore 252 is any repository of information, including, but not limited to, one or more files and/or one or more databases. The O/S 215, in turn, supports a compliance module 300. The compliance module 300 is used to capture information related to all controls in one or more network domains 202 in an enterprise system 201 so that a variety of different reports related to compliance and remediation may be generated. Of note, a control is anything in the enterprise system 201, including but not limited to, a specific computer software product, a port setting, etc. that is required by a policy to maintain compliance between a current enacted policy, such as a system security policy or hardening policy, and the computing environment.

Specifically, the program code of the compliance module 300, which when executed by at least one processor 210 of the server 200, receives from a client 250 a request to scan and/or remediate a system, such as one or more network domains 202, one or more clients 250, and/or the enterprise system 201 itself. Once the request is received, the program code of the compliance module 300 determines whether the request is a request to remediate. In one embodiment, this determination is made by the program code of the compliance module 300 parsing the request to see if a remediation flag (or switch) is present. In a different embodiment, if the program code of the compliance module 300 parses the request and no flag is present, then a determination is made that the request is a scan only request (no remediation). In yet a different embodiment, the program code of the compliance module 300 parses the request to see if a scan only flag is present.

Regardless of how it is determined that a request to remediate is or is not present, the program code of the compliance module 300 loads the compliance and remediation content. The compliance and remediation content maybe of any (file) type, as long as the program code of the compliance module 300 is able to recognize and process the types of content and the switches (flags) in the content. In addition, the compliance and remediation content may be encrypted, but if encrypted, the program code of the compliance module 300 must decrypt the compliance and remediation content prior to loading. In one embodiment, the compliance and remediation content is part of an extensible markup language (XML) file. Additionally, the compliance and remediation content may be physically contained in separate files, in a single file as discrete and separate entries, in a single database, and/or multiple databases. In other words, the compliance and remediation content may come from multiple sources or datastores 242. Of importance, both types of content are loaded by the program code of the compliance module 300 regardless of whether there is a scan only request or a remediation request. By loading both compliance and remediation content, it is possible to ignore the compliance content but still remediate to a specific value as well as keep the system (the enterprise system 201 itself and/or one or more network domains 202 and/or one or more of the clients 250) in compliance with a set policy, such as a hardening policy or a security policy, even when the remediation content is not within the compliance content boundaries with the use of switches, such as an accepted non-compliance switch and an ignore switch.

Upon the compliance and remediation content being loaded, if the program code of the compliance module 300 determined that there was no request to remediate received, but was instead a scan only request, the program code of the compliance module 300 conducts a scan of the system. During the scan, the program code of the compliance module 300 determines all the controls in the system as well as the current setting of those controls. The program code of the compliance module 300 then determines which controls listed in the loaded compliance and remediation content are out of compliance with the required setting of the system policy currently in force, in compliance with the required setting of the system policy currently in force, include an ignore flag or any other flag, and/or has remediation content. In other words, a subset of the controls are found in the entire system that are (1) out of compliance, (2) the out of compliance state is not to be ignored (ignore flag is false or is absent from the loaded compliance and remediation content for a specific control), and (3) has remediation content in the loaded compliance and remediation content.

In one embodiment, whether a control is out of compliance is determined by comparing the current setting of a control with the corresponding compliance setting listed in the compliance and remediation content (or just the compliance content if separate compliance and remediation sources have been loaded) to determine whether the current setting is within or out of range of the compliance setting. If the current setting is out of range of the compliance value (or setting), then a determination is made that the particular control is out of compliance. In addition, the program code of the compliance module 300 parses the compliance and remediation content (or just the remediation content, if separate compliance and remediation sources have been loaded) to determine whether there is remediation content listed for the respective control. If there is a remediation value listed in the compliance and remediation content for the particular control, then a determination is made that remediation content exists for that particular control. Further, whether the out of compliance state is not to be ignored may be determined by the program code of the compliance module 300 parsing the loaded compliance and remediation content and, for the specific control determining whether an ignore flag is set to false or if there is no ignore flag present in the loaded compliance and remediation content for a specific control. If the ignore flag is false or no ignore flag is present, a determination is made that the out of compliance status of the particular control cannot be ignored (or skipped).

Thereafter, the information regarding the subset of controls in the system is stored. Preferably, this information is stored in a matrix, which is a datastore 252 of information. More specifically, a matrix is a set of results (information about the controls) that may be further processed by the program code of the compliance module 300 so the relevant information stored in the matrix is transformed to usable information, usually in the form of reports. The data in the matrix may be filtered, sorted, and reordered as well as reported upon. In a different embodiment, information captured about all the controls as well as the subset of controls are stored in the matrix. Of note, the information is stored anywhere on the system, such as on the server 200, in a datastore 252 on the server 200, in a datastore 252 coupled to the server 200, in a datastore 252 anywhere on the enterprise system 201, and/or in multiple datastores 252. Once information about the controls in the system are determined, captured, and stored, the program code of the compliance module 300 produces and stores reports on the data. More specifically, the program code of the compliance module 300 further processes the information in the matrix, so multiple, different types of reports are generated and then stored. For example, policy compliance error reports, compliance reports, pro forma reports, remediation error reports, and remediation reports can all be generated. Exactly what reports are generated is based on a user's request. In one embodiment, the initial request asking for a scan only or a remediation may contain information as to what type of report is to be generated. In a different embodiment, anytime after a matrix is created with the data corresponding to the controls in the system, a user may request (via an electronic request to the compliance module 300) different types of reports that are created by the program code of the compliance module 300. Further, the various reports are stored anywhere on the system.

If instead of a scan only request, the program code of the compliance module 300 determines that the request was a request to remediate, then a scan of the system is preformed. However, this scan is different than a scan only scan. In particular, this scan scans the system, in part, to build a synchronous rollback file. More specifically the program code of the compliance module 300 determines a list of controls that (1) are out of compliance (the current setting of a control does not comply (match) with the setting indicated in the compliance portion of the loaded compliance and remediation content for a specific control, (2) has an ignore flag (or switch) set to false (in other words, being out of compliance is not to be ignored), and (3) there is remediation content in the remediation portion of the loaded compliance and remediation content for the specific control.

Thereafter, the program code of the compliance module 300 creates a synchronous rollback file for only those controls in the list of controls. In addition, the synchronous rollback file includes information related to the current state of a control as well as what the remediation content is for the corresponding control (for only those controls in the determined list of controls). The program code of the compliance module 300 then copies, moves, and incorporates the current state of information for the determined list of controls with the information captured and determined as part of scan only process. In an embodiment, this information is stored as part of the matrix (the datastore 252). In this way, the current state (setting) of a control is captured and saved, which allows for the original state of a control to be obtained again if after remediation, rollback to the original state is enacted.

After the current state for each of the controls in the determined list of controls is captured, the program code of the compliance module 300 remediates (adjusts) the setting of each control to the corresponding remediation setting listed in the loaded compliance and remediation content. More specifically, only the remediation content is used when remediating the program code of the compliance module 300. Of note, prior to the remediation, the program code of the compliance module 300, if it does not already have administrative-level access or permissions for each end point (any client 250) to be processed in the enterprise system 201, acquires administrative-level permissions for such. Once remediation is completed, the program code of the compliance module 300 re-scans the system. This re-scan is similar to the scan preformed as part of the scan only process.

More specifically, the re-scan determines all the controls in the system as well as the (now) current setting of those controls. Thereafter, a subset of the controls are found in the entire system that are (1) out of compliance, (2) the out of compliance state is not to be ignored (ignore flag is false or not present), and (3) has remediation content in the loaded compliance and remediation content is determined. This information (the current setting of the controls and the subset of controls) along with the information previously moved regarding the prior state of the controls before remediation is stored in a datastore 252 (matrix). Of note, in a different embodiment, the current setting (state) of all controls may also be stored in the matrix (datastore 252). As indicated herein all the data may be stored anywhere on the system and in any repository, whether one or more files, one or more databases, or a combination of both. Thereafter, the program code of the compliance module 300 creates reports and stores the reports based upon the information stored in the matrix. For example, policy compliance error reports, compliance reports, pro forma reports, remediation error reports, and remediation reports may all be generated by the program code of the compliance module 300.

Figure 3:
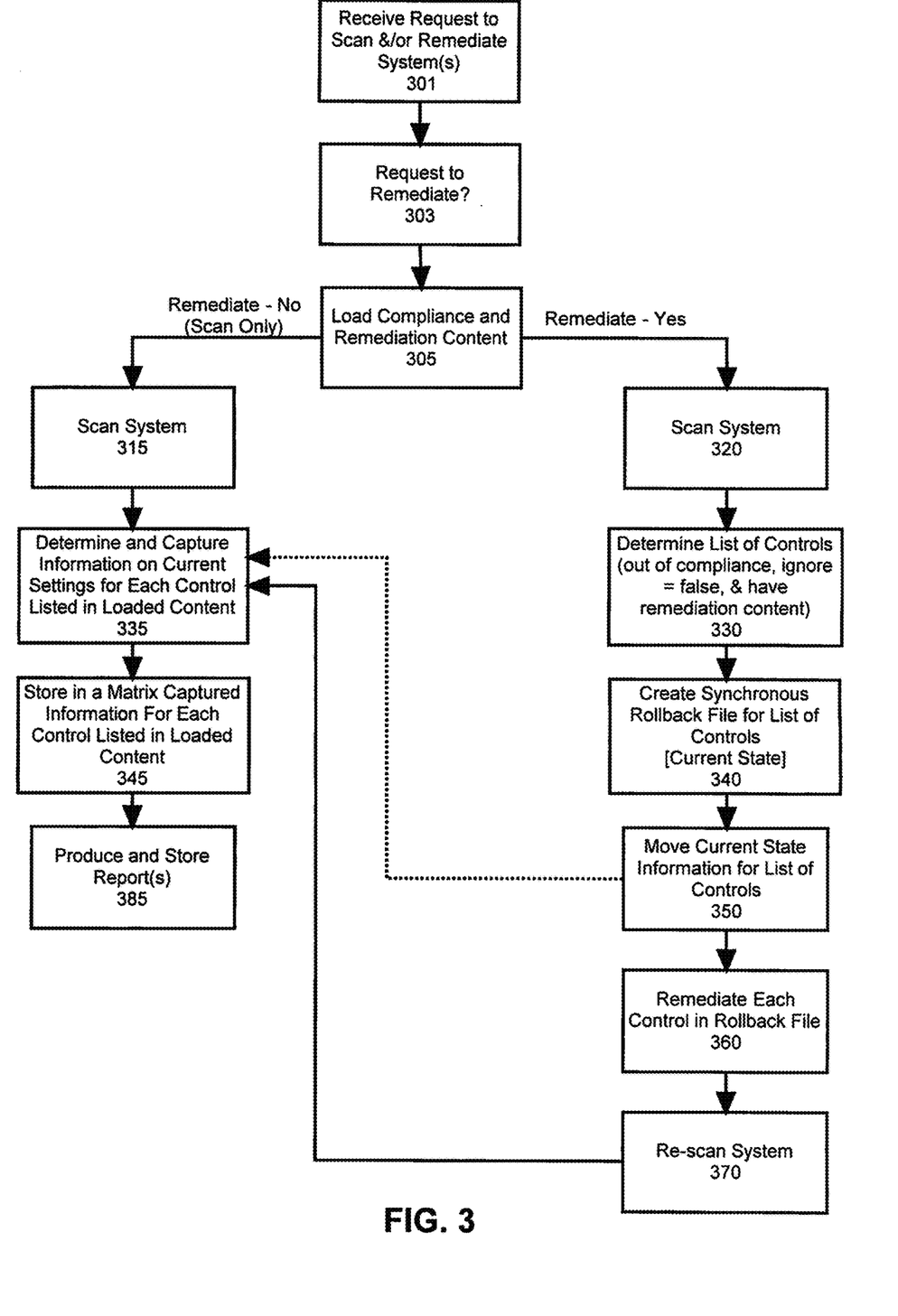

In even yet further illustration of the operation of the program code of the compliance module 300, FIG. 3 shows a flow chart illustrating a process for content processing during scan and remediation in a computer environment. After a user initiates a request to scan and/or remediate one or more systems in the computing environment, the request is received by the program code of the compliance module 300, as shown in block 301. Of note, the term system as used herein refers to the enterprise system itself and/or one or more of the network domains in the enterprise system and/or one or more computing devices in one or more network domains and/or one or more computing devices (end points) outside of the one or more network domains, but within the enterprise system; it is what the program code of the compliance module 300 is scanning and analyzing. The user may initiate the request for any reason, including but not limited to, an error in the computing environment, one or more policy errors indicating the system (computing environment) is out of compliance, or to create a baseline of control settings to establish the current setting of the different controls in the computing environment. Of note, the request may be initiated by any method now known or later developed, such as a user depressing a button (such as labeled "Scan" or "Remediate") in a graphical user interface (GUI) or a user selecting such from a menu in an application. In addition, the request includes information as to the type of processing the program code of the compliance module 300 is to perform. In other words, the request includes information as to whether the user indicated a "Scan Only" is to be preformed or a "Remediation." Additionally, the request also indicates what systems are to be scanned and/or remediated. Once the request is received, the program code of the compliance module 300 determines if the request is a request to remediate, as shown in block 303. In one embodiment, the program code of the compliance module 300 parses the request for a remediation flag, which indicates the request is a request to remediate. If the remediation flag is present, then the request is a request to remediate. In a different embodiment, the program code of the compliance module 300 parses the request for a scan only flag, and if one is present, then the request is a request to scan only. In yet another embodiment, if no flag is present, the program code of the compliance module makes a determination that the request is a scan only request.

Regardless of whether the request is a request to remediate or not, the program code of the compliance module 300 loads the compliance and remediation content, as indicated in block 305. The compliance and remediation content may be written in any language that the program code of the compliance module 300 is capable of processing and includes, but is not limited to, extensible markup language (XML). Also, the compliance and remediation content may be encrypted, but if encrypted, the program code of the compliance module 300 must decrypt the compliance and remediation content prior to loading. Additionally, the compliance and remediation content is stored in one or more datastores, which may includes one or more computer files and/or one or more databases and defines, for one or more controls in a system, what the setting for a specific control is necessary for that specific control to be in compliance with whatever policies are currently enacted on the system. Of note, a control can be anything in the system, including but not limited to, a register key, an entry in a configuration file, such as a STIG or other policy, a specific computer software product, a port setting, etc. In a preferred embodiment, both the compliance content and the remediation content are obtained from a single datastore. However, in a different embodiment, the compliance content is listed in one datastore and the remediation content is stored in a separate datastore. In other words, the content may be loaded from one or more datastores, which may include one or more files, one or more databases, and/or a combination of both. In the case of separate/different compliance and remediation content sources both compliance and remediation content are still loaded, regardless of whether the request was a scan only request. In this way, changes to the computing environment (the system) can be tracked and traced.

In addition, the compliance and remediation content may include specific remediation content for a specific control as well as different flags (logic switches) related to the specific control. More specifically, the loaded compliance and remediation content includes information corresponding to one or more controls, such as what the setting of the control must be in order to be in compliance with a system policy (the compliance content or compliance value), remediation content for the control (a value or range of values the control may be changed to as to maintain the control's conforming compliance status, also referred to as the remediation value), and logic switches.

The logic switches (or flags) further define additional situations for a specific control. The logic flags may include, but are not limited to, accepted non-compliance flag, an ignore switch, a remediation ignore flag, and a control type switch. More specifically, there may be an accepted non-compliance switch, which enables the program code of the compliance module 300 to ignore the control's current setting despite the current setting of the control being out of compliance (i.e. not matching the requirements of the current enacted policy or policies). The compliance and remediation content may also include an ignore switch, which enables the program code of the compliance module 300 to ignore the control (or skip the control) during a scan no matter the control's current setting. Additionally, there may be a remediation ignore switch in the compliance and remediation content for a specific control that enables the program code of the compliance module 300 to ignore (skip) the remediation of the specific control despite there being remediation content for the specific control as part of the compliance and remediation content. Yet further, a control type switch defines different types of controls. In this way, the different logic switches or flags enable an end user to process, generate, and store different types of reports via the program code of the compliance module 300.

Upon both the compliance and remediation content being loaded, as shown in block 305, on the condition that the request was a scan only request (e.g. no remediation flag present), then the program code of the compliance module 300 scans the system as shown in block 315. In particular, during the scan, the program code of the compliance module 300 collects data regarding what controls are in the system as well as the current state (the current setting) of each control. Thereafter, the program code of the compliance module 300 determines and captures information corresponding to the current setting as well as what flags are set for each specific control in the loaded compliance and remediation content, as illustrated in block 335. More specifically, the program code of the compliance module 300 determines which controls listed in the loaded compliance and remediation content are out of compliance with the required setting of the system policy or policies currently in force, in compliance (with the required setting of the system policy currently in force), include an ignore flag or any other flag, and/or has remediation content. In other words, the program code of the compliance module 300 collects and determines information related to the current status of each control contained in the loaded compliance and remediation content. Thereby a list is made, which includes a subset of all controls in the system, where the subset of controls includes controls that are (1) out of compliance, (2) have remediation content listed in the loaded compliance and remediation content, and (3) the state of the control's out of compliance status cannot be ignored (ignore flag is false).

Upon the information related to the status of each control contained in the loaded compliance and remediation content being determined and captured, the information is then stored, as is referenced in block 345. More specifically, a datastore stores the information related to the status of each control in the subset of controls, including, but not limited to, its current setting, whether the current setting meets the compliance standard (or is out of compliance), the presence or absence of any flags or switches the current setting and what those flags are, the compliance value, and/or the remediation value. Of note, all the information determined and captured may be stored for each control or a portion of the information for each control may be stored in a datastore. More specifically, the datastore is organized as a matrix, which captures all the information related to each control in a system included in the loaded compliance and remediation content. Of note, in a different embodiment, information related to all controls (not just the controls found to be out of compliance whose state cannot be ignored and has remediation content) is stored in the matrix. The program code of the compliance module 300 thereafter uses the data in the matrix to generate and store reports, as illustrated in block 385.

More specifically, the program code of the compliance module 300 further processes the information in the matrix, so multiple, different types of reports can be generated and then stored. For example, with the presence of compliance content, remediation content, ignore switch(es), accepted non-compliance switch(es), and control type switch(es), the following types of reports may be generated: (1) A policy compliance error report that reports the controls where the remediation content is different than the compliance content and that difference has not be accepted. (This provides an audit of actual policy.) (2) A straight compliance report that compares system values against compliance values for the different controls in the system. (3) A pro forma report that provides expected compliance information if the controls in the system(s) are remediated. (4) A remediation error report of values that are different than the remediation content but have been ignored. (5) A straight remediation report that shows the status of each control after remediation. Yet further, the program code of the compliance module 300 enables a user to filter the data by any or all of the different switches (e.g., ignore, accepted non-compliance, and control type). Also, the program code of the compliance module 300 may filter, sort, and reorder the information captured in the matrix in addition to creating reports based upon the information in the matrix. Additionally, the program code of the compliance module 300 allows for reporting against compliance content, remediation content, and/or both.

If instead the request indicates remediation shall occur (block 303), then after the compliance and remediation content is loaded, as shown in block 305, the program code of the compliance module 300, scans the systems, as illustrated in block 320. In this scan, the program code of the compliance module 300 determines a list of controls that are (1) out of compliance (the current setting of a control does not comply (match) with the setting indicated in the compliance portion of the loaded compliance and remediation content for a specific control), (2) have an ignore flag (or switch) set to false (in other words, being out of compliance is not to be ignored), and (3) there is remediation content in the remediation portion of the loaded compliance and remediation file for the specific control, as shown in block 330. Thereafter, the program code of the compliance module 300 creates a synchronous rollback file, as illustrated in block 340.

The synchronous rollback file includes information related to the current state of a control as well as what the remediation content (or remediation value) is for the corresponding control. Additionally, the synchronous rollback file is only as large as the number of controls to be remediated. For example, if there are five hundred (500) controls to be evaluated in the system, but only one control that is out of compliance, the ignore switch is set to false, and has remediation content, then the resulting synchronous rollback file will be relatively small. In other words, the size of the synchronous rollback file is based on the total number of controls that are to be remediated (the setting for the specific control is found to be out of compliance, ignore switch set to false, and has remediation content).

After the synchronous rollback file is created for a list of controls and prior to remediation, the information pertaining to the current state for the listed controls to be remediated is moved, as shown in block 350, and incorporated with the information determined and captured as part of block 335. In other words, the current state (setting) of all the controls is the list of controls captured prior to each control being updated according to the remediation content listed in the loaded compliance and remediation content. Of note, if information has not yet been determined or captured in a prior scan process, the information is still incorporated with the loaded compliance and remediation content.

After the information is moved, each control listed in the (synchronous) rollback file is remediated, as in block 360. More specifically, the setting of the control listed in the rollback file is adjusted to the new setting listed for the control in the remediation portion of the loaded compliance and remediation content. Once the setting has been changed to the new setting, the program code of the compliance module 300 then re-scans the system, as illustrated in block 370, which captures the current state of each control. Thereafter, the program code of the compliance module 300 again executes the same steps as listed in blocks 335, 345, and 385, as described above, so that a matrix of information corresponding to each control is created and reports may be produced and stored. Unlike the scan only process, the remediate process captures the state (the current setting) of each control prior to being changed (remediated) and also after being remediated as well as what the remediation value is, whereas the scan only process only captures the current state (current setting) of a control (as there is no remediation performed).

Of note, prior to remediation, the program code of the compliance module 300 must have already adopted administrative-level permissions for each end point to be processed. In this way, the compliance module 300 is able to make adjustments to different settings as dictated by the loaded compliance and remediation content. If administrative-level permissions for each end point to be process have not yet been adopted, the program code of the compliance module 300 first obtains administrative-level permissions prior to remediation.

Of note, the above referenced compliance and remediation content may involve one or more sets of logic (one or more policies), where each set of logic (policy) may include one or more separate remediation and compliance content sources. More specifically, there can be a single policy (defining both compliance and remediation content) for a single end point (client or computing device). Multiple policies (multiple sources) defining content for one end point. Multiple policies defining content for multiple end points. Or a single policy for multiple end points. As used herein, a policy refers to anything, including, but not limited to, a configuration file or a STIG, that defines a requirement for a control. Further, as referenced herein, the remediation logic (or content) allows for the setting of remediation values different than the compliance values in order to fix the system as required without losing the compliance tracking and comparison provided by the discrete compliance content. In other words, the multiple entry content (whether implemented from one single source or two different datastores, one including compliance logic and the other remediation logic) enables traceability of any changed (updated) controls, which further enables rollback (changing from the updated setting back to the original setting) of controls. Further, during the scan and rescan processes, both compliance content (logic) and also remediation content (logic) are required. But in the fix process (remediate), only the remediate content is required.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device. With specific reference to a computer readable storage medium, it is to be understood that a computer readable storage medium excludes transitory media, such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object-oriented programming language and conventional procedural programming languages.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatuses (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowcharts and/or block diagram block or blocks.

Finally, the terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, denote the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step-plus-function elements in the claims below are intended to include any structure, material, or act for performing the function in combination with other claimed elements as specifically noted. The depiction of the present invention has been offered for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

I claim:

1. A computer processor implemented method for processing content in a computing environment, comprising:
   receiving a remediation request for the computing environment;
   responding to the request by loading both compliance content referencing one or more controls in the computing environment and also remediation content, the compliance content comprising, for each control referenced, one or more compliance values each defining a current setting of a control in the computing environment for which the control is compliant with a policy enacted on the computing environment, the remediation content comprising, for each of the controls in the compliance content, both a remediation value defining a new setting of the control in the computing environment for which the current setting of the control is changed to, and also an ignore switch indicating whether the current setting of the control is ignored;
   scanning the computing environment to determine all controls in the computing environment and also to capture information including a current setting for each control;
   determining a subset of out-of-compliance ones of the controls from all of the controls, and filtering the subset of the out-of-compliance ones of the controls to only those of the out of compliance ones of the controls having in the compliance content both the ignore switch indicating that an out of compliance state is not to be ignored, and also a corresponding remediation value;
   creating a synchronous rollback file and moving current state information for the filtered subset of the out-of-compliance ones of the controls into the rollback file along with corresponding remediation values for respective ones of the controls in the filtered subset;
   remediating each of the out-of-compliance ones of the controls in the filtered subset with the remediation value set forth in the compliance content;
   re-scanning the computing environment to determine all controls in the computing environment and also to capture information including the current setting for each control of the determined controls;

storing in a matrix the captured information including the current setting for each control of the determined controls;

determining from the remediation request, a specific report type; and, generating a report of the specific report type based upon the captured information stored in the matrix.

2. The method of claim 1, wherein the ignore switch includes an accepted non-compliance switch indicating a non-compliant state is acceptable despite a determination that a current setting of a non-compliant one of the out-of-compliance ones of the controls does not match the compliance value for the corresponding control listed in the loaded content.

3. The method of claim 1, further comprising generating a report based upon the captured information for each control in the subset of out-of-compliance ones of the controls.

4. The method of claim 1, wherein determining the subset of out-of-compliance ones of the controls from all controls comprises determining whether each control in the subset of out-of-compliance ones of the controls is out of compliance by comparing the current setting of one of the all controls with the compliance value corresponding to the one of the all controls in the loaded content and on condition that the current setting and the compliance value do not match, determining that the one control is out of compliance.

5. The method of claim 1, wherein determining the subset of out-of-compliance ones of the controls from all controls comprises determining that the out of compliance state is not to be ignored further comprises parsing the loaded content and determining that a corresponding ignore switch indicating the out of compliance state is not be ignored is present.

6. A compliance system, comprising:

at least one computer with at least one processor and memory coupled to a computing environment;

a datastore storing content coupled to the computing environment;

a compliance module executing in memory of the at least one computer, the compliance module comprising program code that when executed by the at least one processor causes the at least one computer to:

receive a remediation request for the computing environment;

respond to the request by loading both compliance content referencing one or more controls in the computing environment and also remediation content, the compliance content comprising, for each control referenced, one or more compliance values each defining a current setting of a control in the computing environment for which the control is compliant with a policy enacted on the computing environment, the remediation content comprising, for each of the controls in the compliance content, both a remediation value defining a new setting of the control in the computing environment for which the current setting of the control is changed to, and also an ignore switch indicating whether the current setting of the control is ignored;

scan the computing environment to determine all controls in the computing environment and also to capture information including a current setting for each control;

determine a subset of out-of-compliance ones of the controls from all of the controls, and filtering the subset of the out-of-compliance ones of the controls to only those of the out of compliance ones of the controls having in the compliance content both the ignore switch indicating that an out of compliance state is not to be ignored, and also a corresponding remediation value;

create a synchronous rollback file and moving current state information for the filtered subset of the out-of-compliance ones of the controls into the rollback file along with corresponding remediation values for respective ones of the controls in the filtered subset;

remediate each of the out-of-compliance ones of the controls in the filtered subset with the remediation value set forth in the compliance content;

re-scan the computing environment to determine all controls in the computing environment and also to capture information including the current setting for each control of the determined controls;

store in a matrix the captured information including the current setting for each control of the determined controls;

determine from the remediation request, a specific report type; and, generate a report of the specific report type based upon the captured information stored in the matrix.

7. The system of claim 6, wherein the ignore switch includes an accepted non-compliance switch indicating a non-compliant state is acceptable despite a determination that a current setting of a non-compliant one of the out-of-compliance ones of the controls does not match the compliance value for the corresponding control listed in the loaded content.

8. The system of claim 6, wherein the program code of the compliance module that when executed by the at least one processor further causes the at least one computer to generate a report based upon the captured information for each control in the subset of out-of-compliance ones of the controls.

9. A computer program product for processing content in a computing environment, the computer program product comprising:

a non-transitory computer readable storage medium having computer readable program code embodied therewith that when executed by a processor of a computer causes the computer to:

receive a remediation request for the computing environment;

respond to the request by loading both compliance content referencing one or more controls in the computing environment and also remediation content, the compliance content comprising, for each control referenced, one or more compliance values each defining a current setting of a control in the computing environment for which the control is compliant with a policy enacted on the computing environment, the remediation content comprising, for each of the controls in the compliance content, both a remediation value defining a new setting of the control in the computing environment for which the current setting of the control is changed to, and also an ignore switch indicating whether the current setting of the control is ignored;

scan the computing environment to determine all controls in the computing environment and also to capture information including a current setting for each control;

determine a subset of out-of-compliance ones of the controls from all of the controls, and filtering the subset of the out-of-compliance ones of the controls to only those of the out of compliance ones of the controls an out of compliance state is not to be ignored, and also a corresponding remediation value;

create a synchronous rollback file and moving current state information for the filtered subset of the out-of-compliance ones of the controls into the rollback file along with corresponding remediation values for respective ones of the controls in the filtered subset; and, remediate each of the out-of-compliance ones of the controls in the filtered subset with the remediation value set forth in the compliance content;

re-scan the computing environment to determine all controls in the computing environment and also to capture information including the current setting for each control of the determined controls;

store in a matrix the captured information including the current setting for each control of the determined controls;

determine from the remediation request, a specific report type; and, generate a report of the specific report type based upon the captured information stored in the matrix.

10. The computer program product of claim 9, wherein the ignore switch includes an accepted non-compliance switch indicating a non-compliant state is acceptable despite a determination that a current setting of a non-compliant one of the out-of-compliance ones of the controls does not match the compliance value for the corresponding control listed in the loaded content.

11. The computer program product of claim 9, wherein the computer readable program code embodied therewith that when executed by the processor of the computer further causes the computer to generate a report based upon the captured information for each control in the subset of out-of-compliance ones of the controls.

12. The computer program product of claim 9, wherein determining the subset of out-of-compliance ones of the controls from all controls comprises determining whether each control in the subset of out-of-compliance ones of the controls is out of compliance by comparing the current setting of one of the all controls with the compliance value corresponding to the one of the all controls in the loaded content and on condition that the current setting and the compliance value do not match, determining that the one control is out of compliance.

13. The computer program product of claim 9, wherein determining the subset of controls from all controls comprises determining that the out of compliance state is not to be ignored by parsing the loaded content and determining that a corresponding ignore switch indicating the out of compliance state is not be ignored is present.

* * * * *